(12) United States Patent
Wright

(10) Patent No.: US 6,605,972 B1
(45) Date of Patent: Aug. 12, 2003

(54) INTEGRATED CIRCUIT WITH SWITCHED CAPACITOR NETWORK FOR RECYCLING POWER

(75) Inventor: Bradley J. Wright, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/255,436

(22) Filed: Sep. 26, 2002

(51) Int. Cl.[7] .................................................. G06F 1/04
(52) U.S. Cl. ........................ 327/291; 327/293; 327/337
(58) Field of Search ................................ 327/291, 293, 327/295, 297, 298, 337

(56) References Cited

U.S. PATENT DOCUMENTS 4,002,839 A * 1/1977 Karl et al. .................. 370/507

* cited by examiner

Primary Examiner—Kenneth B. Wells
(74) Attorney, Agent, or Firm—Westman, Champlin & Kelly

(57) ABSTRACT

A method and apparatus are provided for recycling power in an integrated circuit. The integrated circuit includes a plurality of nets and a switched capacitor network. The plurality of nets includes a first logic net having a tendency to repetitively switch between logic high and low states during normal operation of the integrated circuit. The switched capacitor network includes a plurality of capacitors, which are selectively decoupled from the plurality of nets, selectively coupled to the first logic net in parallel with one another, and selectively coupled to at least one of the nets in series with one another.

20 Claims, 4 Drawing Sheets

Recycling Clock Driver

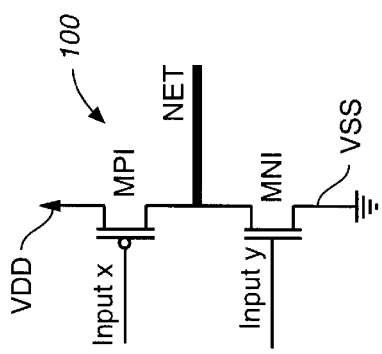
FIG._1
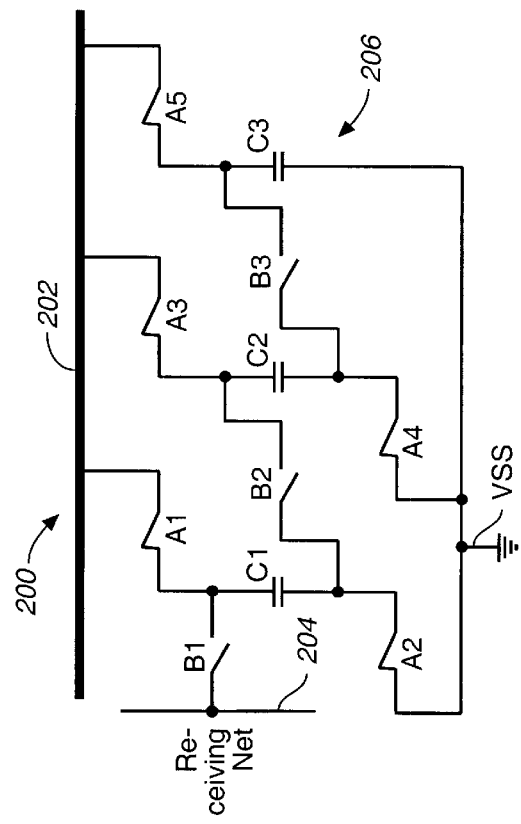
FIG._2
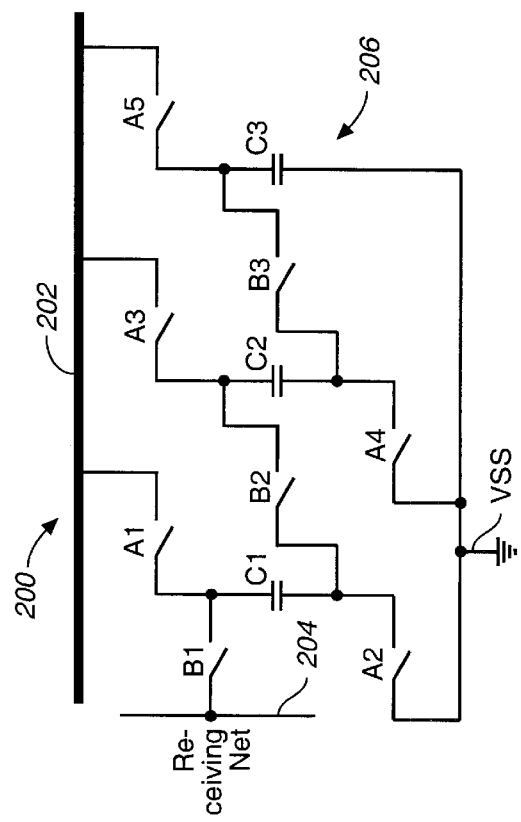
FIG._3

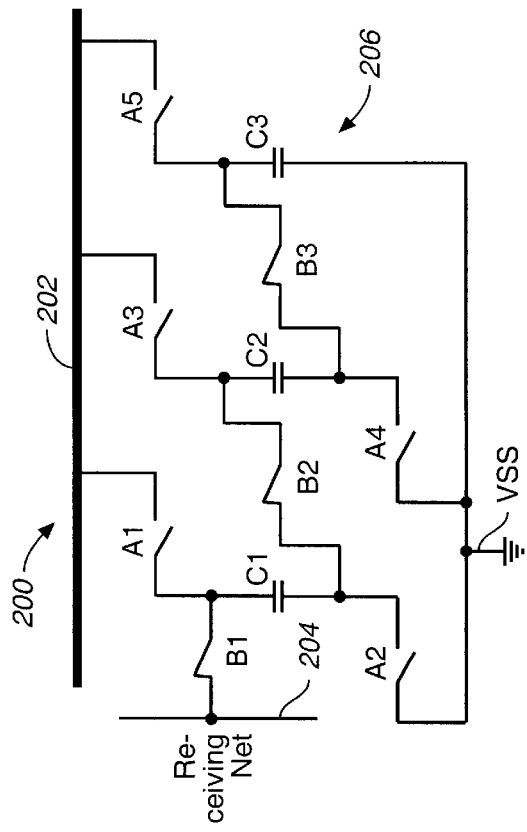
FIG._5
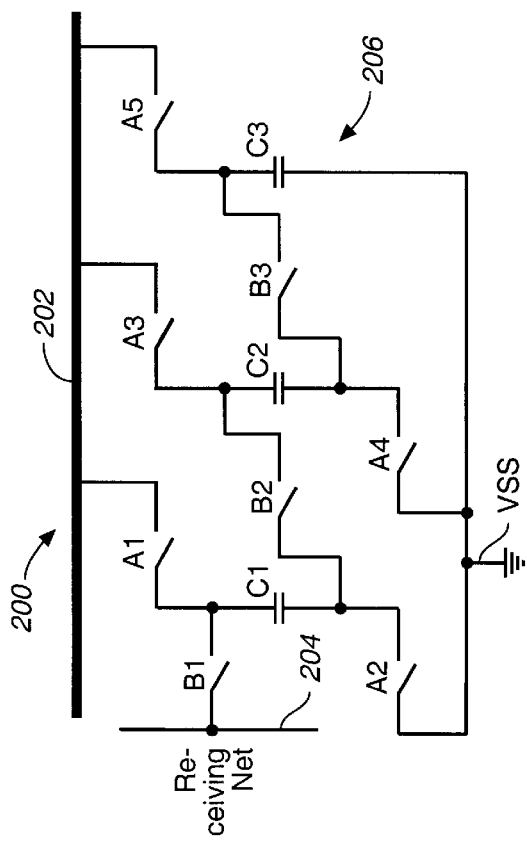
FIG._4

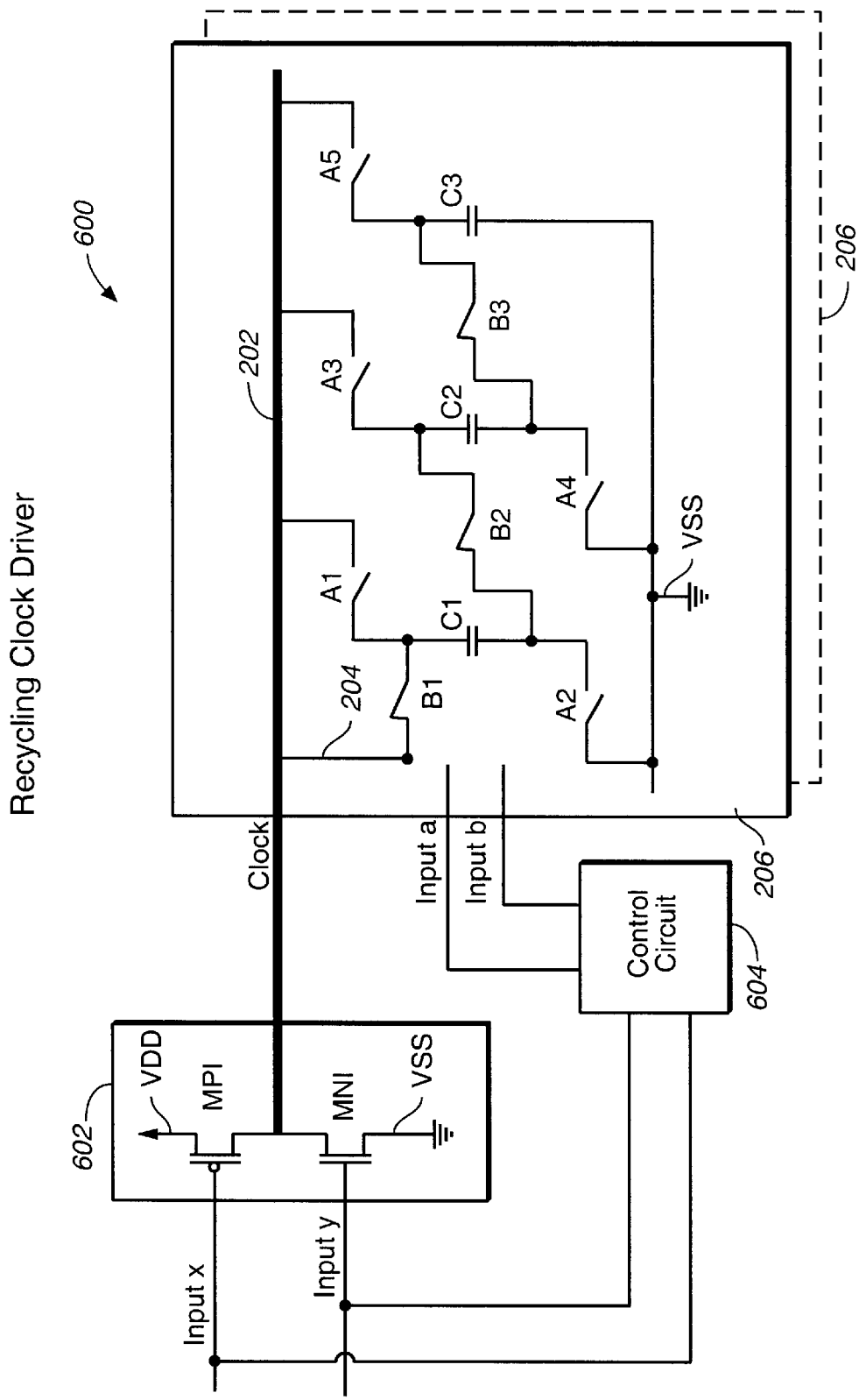
FIG._6

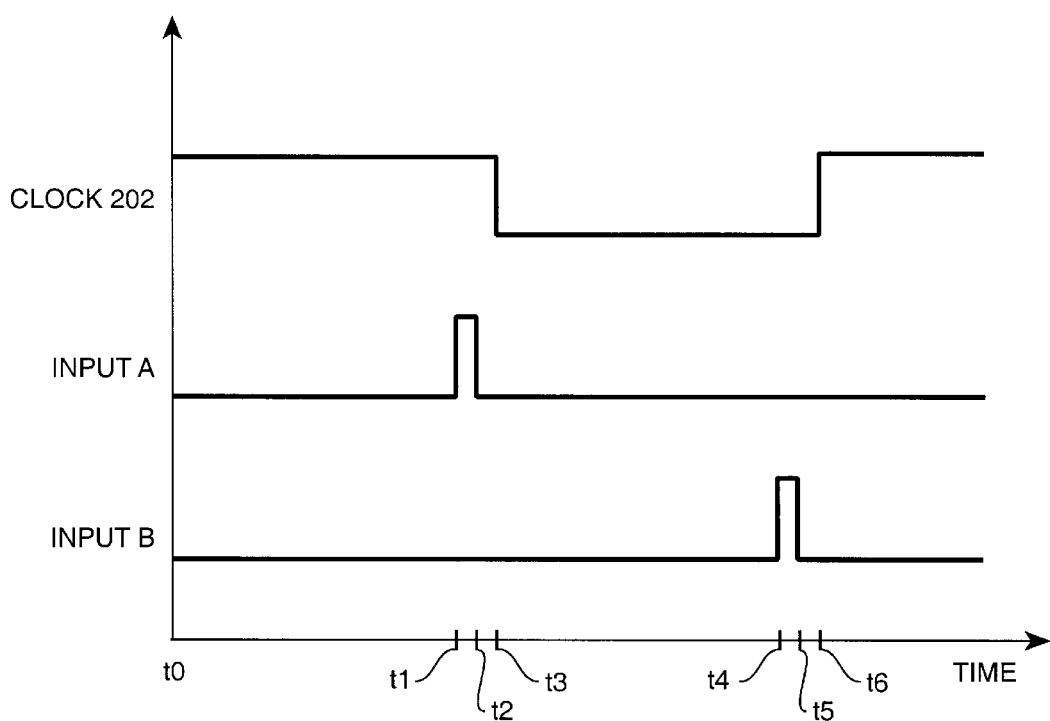
FIG._7

INTEGRATED CIRCUIT WITH SWITCHED CAPACITOR NETWORK FOR RECYCLING POWER

BACKGROUND OF THE INVENTION

The present invention relates to low power integrated circuit designs and, more particularly to recycling power in an integrated circuit.

Integrated circuits include numerous semiconductor devices, which are connected together and powered through a plurality of conductive "nets". Several of these nets, such as clock lines, have a tendency to repetitively switch between logic high and logic low states during normal operation of the integrated circuit. In certain applications, up to 30% of the power consumed by an integrated circuit is used for charging and discharging these repetitively switching nets.

It is desirable for integrated circuits to consume as little power as possible, particularly for power sensitive circuits such as portable electronic devices. Typical approaches to reducing power consumption in an integrated circuit include lowering supply voltages, the use of low leakage transistors, and turning off unused portions of the integrated circuit. However even with these approaches, a large amount of power will still be consumed nets that are repetitively charged and discharged. Improved power savings approaches are therefore desired which are capable of recycling at least some of this lost power.

SUMMARY OF THE INVENTION

One embodiment of the present invention is directed to an integrated circuit clock network, which includes at least one clock net, including a first clock net, a clock driver, and a switched capacitor network. The clock driver has a clock output coupled to the first clock net. The switched capacitor network includes a plurality of capacitors, which are selectively decoupled from the clock network, selectively coupled to the first clock net in parallel with one another, and selectively coupled to at least one of the clock nets in series with one another.

Another embodiment of the present invention is directed to an integrated circuit. The integrated circuit includes a plurality of nets and a switched capacitor network. The plurality of nets includes a first logic net having a tendency to repetitively switch between logic high and low states during normal operation of the integrated circuit. The switched capacitor network includes a plurality of capacitors, which are selectively decoupled from the plurality of nets, selectively coupled to the first logic net in parallel with one another, and selectively coupled to at least one of the nets in series with one another.

Yet another embodiment of the present invention is directed to a method of recycling power in an integrated circuit having a plurality of nets. The method includes: (a) repetitively switching a first of the nets on the integrated circuit between logic high and low states during normal operation of the integrated circuit; (b) temporarily coupling a plurality of capacitors to the first net in parallel with one another when the first net is in the logic high state and then decoupling the plurality of capacitors from the first net while the first net is still in the logic high state; and (c) temporarily coupling the plurality of capacitors in series with one another to at least one of the nets, after step (b).

BRIEF DESCRIPTION OF THE DRAWINGS

FIG. 1 illustrates a typical output driver for a net within a CMOS integrated circuit.

FIGS. 2–5 are diagrams illustrating a switched capacitor network during successive operational states for storing charge from a first net and returning the charge to a second net, according to one embodiment of the present invention.

FIG. 6 is a diagram illustrating a clock network in which the switched capacitor network shown in FIGS. 2–5 is used, according to one embodiment of the present invention.

FIG. 7 is a timing diagram illustrating various waveforms generated in the circuit shown in FIG. 6 over time.

DETAILED DESCRIPTION OF THE PREFERRED EMBODIMENTS

Embodiments of the present invention recapture some of the energy lost in an integrated circuit as certain nets in the circuit are repetitively charged and discharged. Logic nets in a complementary metal oxide semiconductor (CMOS) integrated circuit are typically driven by a push/pull output driver that is capable of charging the net toward the voltage on the power supply rail and discharging the net toward the voltage on the ground supply rail. Some of these logic nets, such as clock nets, are repetitively charged and discharged.

FIG. 1 illustrates a typical output driver 100 in a CMOS integrated circuit. Output driver 100 includes an N-channel pull-down transistor MN1 and a P-channel pull-up transistor MP1. Pull-down transistor MN1 has a gate coupled to Input Y, a source coupled to ground supply net VSS and a drain coupled to output net NET. Pull-up transistor MP1 has a gate coupled to Input X, a source coupled to power supply net VDD and a drain coupled to output net NET. Ground supply net VSS can be coupled to any ground supply strap or a ground bus, for example. Similarly, power supply net VDD can be coupled to any power supply strap or a power bus, for example.

Input X and Input Y typically have the same logic states and can be coupled together or driven by individual circuits (not shown). When Input X and Input Y are in a logic high state, pull-down transistor MN1 is on and pull-up MP1 is off. Pull-down transistor MN1 discharges the voltage on output net NET toward the voltage on VSS. When Input X and Input Y are in a logic low state, pull-down transistor MN1 is off and pull-up transistor MP1 is on. Pull-up transistor MP1 charges the voltage on output net NET high toward the voltage on VDD. Output driver 100 can therefore charge output net NET to a logic high state or discharge output net NET to a logic low state, depending on the logic states of Input X and Input Y.

When NET is being charged, the power supply net VDD supplies the charge, which is pushed onto NET by pull-up transistor MP1. When NET is being discharged, pull-down transistor MN1 pulls charge from NET and routes this charge to the ground supply net VSS, where the charge is eventually routed off of the integrated circuit.

Certain output nets in an integrated circuit have a tendency to repetitively switch between logic high and low states during normal operation of the integrated circuit. For example, clock nets repetitively switch between logic high and low states at regular intervals. Other nets in the integrated circuit can also have a tendency to frequently switch states during normal operation of the integrated circuit. These nets can switch at regular or irregular intervals. For nets that repetitively switch logic states, the repetitive charging and discharging of these nets represents wasted energy.

The energy lost for each charge and discharge cycle is given by, $$E = CV^2/2 \qquad \text{EQ. 1}$$

where E represents energy, C represents the capacitance of the net being charged and discharged, and V represents the voltage difference between the charged and discharged states (logic high and logic low states).

Though it is not possible to reclaim all of the charge that is discharged from a net, it is possible to store some of this charge and return it to the same net or another net later in the cycle to thereby recycle some of the energy consumed in charging the net.

FIG. 2 is a diagram illustrating a circuit 200 for storing charge from a first net 202 and returning the charge to a second net 204 within an integrated circuit. First net 202 can include any logic net having a tendency to repetitively switch between logic high and logic low states during normal operation of the integrated circuit. For example, first net 202 can include a clock net, which switches states at regular intervals, or another type of net that frequently switches states at regular or irregular intervals. Second net 204 can include any net on the integrated circuit, such as the first net 202, another net (such as another clock net), or the power supply net VDD (shown in FIG. 1).

Circuit 200 includes a switched capacitor network 206, which is coupled between first net 202, second net 204 and ground supply net VSS. Switched capacitor network 206 includes a first set of switches A1–A5, a second set of switches B1–B3, and a set of capacitors C1–C3. Switches A1–A5 and B1–B3 can include any type of switch, such as transistor, that can be implemented on an integrated circuit. Similarly, capacitors C1–C3 can include any type of capacitive structure that can be implemented on an integrated circuit.

Switch A1 is coupled in series between net 202 and a first terminal of capacitor C1, and switch A2 is coupled in series between a second terminal of capacitor C1 and ground supply net VSS. Switch A3 is coupled in series between net 202 and a first terminal of capacitor C2, and switch A4 in series between a second terminal of capacitor C2 and ground supply net VSS. Switch A5 is coupled in series between net 202 and a first terminal of capacitor C3. The second terminal of capacitor C3 is coupled to ground supply net VSS.

In one embodiment, switches A1–A5 are controlled by a first control signal (not shown in FIG. 2), which operates switches A1–A5 between active and inactive states. When switches A1–A5 are in the inactive state, as shown in FIG. 2, the switches are open and decouple capacitors C1–C3 from first net 202 and ground supply net VSS. When switches A1 and A5 are in the active state, the switches are closed and couple capacitors C1–C3 in parallel with one another between first net 202 and ground supply net VSS.

Switch B1 is coupled in series between the first terminal of capacitor C1 and second net 204. Switch B2 is coupled in series between the second terminal of capacitor C1 and the first terminal of capacitor C2. Similarly, switch B3 is coupled between the second terminal of capacitor C2 and the first terminal of capacitor C3. Switches B1–B3 are controlled by a second control signal (also not shown in FIG. 2), which operates switches B1–B3 between active and inactive states. In the inactive state, switches B1–B3 are open and decouple capacitors C1–C3 from each other and from second net 204. In the active state, switches B1–B3 are closed and couple capacitors C1–C3 in series with one another between second net 204 and ground supply net VSS.

During operation, switched capacitor network 206 begins in the state shown in FIG. 2 with capacitors C1–C3 being decoupled from first net 202, second net 204 and ground supply net VSS. Switches A1–A5 and B1–B3 are open. An output driver (not shown) similar to the one shown in FIG. 1 fully charges first net 202.

The next state is shown in FIG. 3. Just before the output driver begins to discharge net 202, switches A1–A5 are closed to couple capacitors C1–C3 in parallel with one another between first net 202 and ground supply net VSS. Through charge sharing between capacitors C1–C3 and the capacitance on first net 202, some of the charge on first net 202 is stored in capacitors C1–C3. Since capacitors C1–C3 are coupled in parallel with one another their capacitances are summed. The amount of charge stored in capacitors C1–C3 is therefore dependent on the capacitance of first net 202 and the sum of capacitors C1–C3.

After a fixed amount of time, but before the normal discharge of first net 202 begins, switched capacitor network 206 moves to the next state as shown in FIG. 4. Switches A1–A5 are opened, which decouples capacitors C1–C3 from first net 202.

Anytime after switches A1–A5 have stabilized in the open state switches B1–B3 can be closed, as shown in FIG. 5. This couples capacitors C1–C3 in series with one another between second net 204 and ground supply net VSS. With capacitors C1–C3 coupled together in series the capacitance seen by second net 204 from capacitors C1–C3 is reduced. The energy stored in capacitors C1–C3 remains constant, and the voltage applied to second net 204 as a result of the charge stored on capacitors C1–C3 is increased. Because the effective capacitance of capacitors C1–C3 is now lower, a greater percentage of the charge stored in capacitors C1–C3 can be shared with receiving net 204. This allows some of the charge that was used to charge first net 202 to be recycled back into the integrated circuit. The recycled charge on net 204 can be fed back to net 202 for the next charging cycle. Alternatively, this recycled charge can be fed back to some other net or even the power supply net VDD.

The following analysis illustrates the amount of energy that can be saved with the circuit shown in FIGS. 2–5 in an ideal circuit. Assume that there are three capacitors as shown in FIGS. 2–5 and that net 202 is a clock net with a capacitance of C. Net 202 charges to a voltage V(init) once each cycle, and the desired output of the series-connected capacitors C1–C3 is also V(init).

Since there are three capacitors, each capacitor must have a capacitance of 2/3 C in this example. The initial charge on capacitors C1–C3 is 0.

When net 202 is fully charged, before switches A1–A5 turn on, the charge stored on net 202 is, $$Q = V(init)C \qquad \text{EQ.2}$$

When switches A1–A5 are closed (as shown in FIG. 3), the charge on net 202 is shared with capacitors C1–C3 such that the voltage on net 202 becomes, $$V(after) = Q/C = Q/(C + 3*2/3C) = Q/3C \qquad \text{EQ.3}$$

Making the appropriate substitutions from EQ. 2, $$V(after) = V(init)C/3C = V(init)/3 \qquad \text{EQ.4}$$

After capacitors C1–C3 are charged, switches A1–A5 are opened (as shown in FIG. 4) and switches B1–B3 are closed (as shown in FIG. 5). This changes capacitors C1–C3 from being in parallel with one another to being in series with one another. In this configuration, the voltages on capacitors on C1–C3 add so that the output voltage V(out) supplied to receiving net 204 is, $$V(out)=3*V(after)=V(init) \qquad EQ.5$$

The total energy stored on capacitors C1–C3 is, $$E=1/2*(3*2/3*C)/3*V(init)^2=2/3C*V(init)^2 \qquad EQ.6$$

The total energy consumed by charging net 202 was, $$E=1/2*C*V(init)^2 \qquad EQ.7$$

Therefore, if all of the charge stored on net 202 could be captured, ⅔ of the energy spent charging net 202 can be saved during that cycle of the clock signal. Again, this is an ideal example. In an actual circuit, the energy savings would be much less than ⅔. In any case, a significant energy saving can be made by recycling at least some of the charge used to charge repetitively switching nets in an integrated circuit.

FIG. 6 is a diagram illustrating an integrated circuit clock network according to one embodiment of the present invention in which the switched capacitor network shown in FIGS. 2–5 can be used. Clock network 600 includes clock driver 602, net 202, switched capacitor network 206, receiving net 204 and control circuit 604. In this embodiment, net 202 is a clock net.

Clock driver 602 is similar to output driver 100 shown in FIG. 1, and the same reference numerals are used in FIG. 6 as where used in FIG. 1 for the same or similar elements. Again, clock driver 602 includes N-channel transistor MN1 and P-channel transistor MP1. Pull-down transistor MN1 has a gate coupled to Input Y, a source coupled to ground supply net VSS and a drain coupled to clock net 202. Pull-up transistor MP1 has a gate coupled to Input X, a source coupled to power supply net VDD and a drain coupled to clock net 202. Inputs X and Y can be coupled together or driven by separate control logic (not shown). Inputs X and Y are driven by a clock generator circuit (not shown) that is implemented either on the same integrated circuit as output driver 602 or on an external device.

In this embodiment, receiving net 204 is coupled to clock net 202 such that the charge stored on capacitors C1–C3 is fed back to clock net 202. Control circuit 604 generates switch control signals, Input A and Input B, as a function of the signals used to control clock driver 602, such as Input X and Input Y. Alternatively, control circuit 604 can operate as a function of the logic state of clock net 202 or other signals within clock driver 602 or the clock generation circuitry used to control clock driver 602. Control circuit 604 can be implemented in hardware, software or a combination of both hardware and software. For example in one embodiment control circuit 604 is implemented as a state machine, which activates the switch control signals at the appropriate times within each clock cycle to recycle some of the charge used to charge clock net 202.

FIG. 7 is a timing diagram illustrating various signals within clock network 600 over time. Switch control signal Input A controls switches A1–A5, and switch control signal Input B controls switches B1–B3. At time t0, pull-up transistor MP1 is on and charges clock net 202 to the logic high state. Pull-down transistor MN1 is off. At time t3, pull-up transistor MP1 turns off, and pull-down transistor MN1 turns on thereby discharging clock net 202 to a logic low state. At time t6, pull-down transistor MN1 turns off and pull-up MP1 turns on to re-charge clock net 202 to the logic high state.

Just prior to time t3 at which clock net 202 begins to discharge, control circuit 604 pulses input A to a logic high state, thereby temporarily closing switches A1–A5 from time t1 to time t2. As described above, this stores some of the charge on clock net 202 in capacitors C1–C3 through charge sharing. Just prior to the time as which clock net 202 begins to discharge, control circuit 604 temporarily pulses Input B to close switches B1–B3 from time t4 to time t5 to allow some of the charge stored on capacitors C1–C3 to be fed back onto clock net 202. Switches B1–B3 are then opened at time t5 so that pull-up transistor MP1 can begin supplying the remainder of charge onto clock net 202 without the additional load of capacitances C1–C3. This process can repeat with each cycle of clock net 202 or at other intervals. The timing of switch control signals Input A and Input B can be optimized for particular applications, if desired. For example, capacitors C1–C3 can take a certain amount of time to charge and discharge. To minimize the overall affect of the charge and discharge times of the capacitors, multiple banks of switched capacitor networks can be used to allow longer discharge cycles. As shown by the dashed line in FIG. 6, multiple switched capacitor networks 206 can be coupled in parallel with one another to clock net 202. With multiple switched capacitor networks, a first network can charge during a first cycle of clock net 202 and then discharge during a subsequent cycle. Therefore, one switched capacitor network can be used to store charge while another network can be used to supply charge. Use of multiple banks of switched capacitor networks allows longer discharge cycles. Also, using more, smaller capacitors can improve charge speed. In addition, many components that operate on non-inverted clocks are more sensitive to the rising edge of the clock than the falling edge of the clock. In these applications, switched capacitor networks can be used on nets that are not sensitive to slew on the falling edge of the clock.

Although the present invention has been described with reference to preferred embodiments, workers skilled in the art will recognize that changes may be made in form and detail without departing from the spirit and scope of the invention. For example, the number and arrangement of switches and capacitors can be modified to such any particular application. The transistors shown in the figures can include individual transistors or arrays of transistors coupled together in parallel with one another. The voltage supply terminals can be relatively positive or relatively negative depending upon the particular convention adopted and the technology used and can include a power supply bus or a biased referenced terminal having a voltage other than that of the power supply bus, for example. The terms "high" and "low" used in the specifications and the claims are arbitrary terms and are interchangeable with a logical inversion of the circuit. Likewise, the term "coupled" can include various types of connections or couplings and can include a direct connection or a connection through one or more intermediate components.

What is claimed is:

1. An integrated circuit clock network comprising:
    a clock network having at least one clock net, including a first clock net;
    a clock driver having a clock output coupled to the first clock net; and
    a switched capacitor network comprising a plurality of capacitors selectively decoupled from the clock network, selectively coupled to the first clock net in parallel with one another, and selectively coupled to at least one of the clock nets in series with one another.

2. The integrated circuit clock network of claim 1 wherein the plurality of capacitors are selectively coupled to the first clock net in series with one another.

3. The integrated circuit clock network of claim 1 wherein the clock network further comprises a second clock net and the plurality of capacitors are selectively coupled to the second clock net in series with one another.

4. The integrated circuit clock network of claim 1 and further comprising:
a plurality of switched capacitor networks, wherein each switched capacitor network comprises a plurality of capacitors selectively decoupled from the clock network, selectively coupled to the first clock net in parallel with one another, and selectively coupled to at least one of the clock nets in series with one another.

5. The integrated circuit clock network of claim 4 wherein the plurality of switched capacitor networks are switched independently of one another.

6. The integrated circuit clock network of claim 1 wherein the switched capacitor network comprises:
a first set of transistors having an active state, which couples the plurality of capacitors in parallel with one another, between the first clock net and a ground supply net and an inactive state, which decouples the plurality of capacitors from the first clock net; and
a second set of transistors having an active state, which couples the plurality of capacitors in series with one another, between the ground supply net and at least one of the clock nets and an inactive state, which decouples the plurality of capacitors from the clock net.

7. The integrated circuit clock network of claim 6 wherein:
the clock driver comprises a pull-up transistor and a pull-down transistor, which alternately switch the first clock net between a charged state and a discharged state.

8. The integrated circuit clock network of claim 7 and further comprising:
control means for temporarily pulsing the first set of transistors from the inactive state to the active state and then back to the inactive state just prior to the first clock net switching from the charged state to the discharged state, for temporarily pulsing the second set of transistors from the inactive state to the active state and then back to the inactive state just prior to the first clock net switching from the discharged state to the charged state, and for holding the first and second set of transistors in the inactive state at all other times.

9. An integrated circuit comprising:
a plurality of nets, including a first logic net having a tendency to repetitively switch between logic high and low states during normal operation of the integrated circuit; and
a switched capacitor network comprising a plurality of capacitors selectively decoupled from the plurality of nets, selectively coupled to the first logic net in parallel with one another, and selectively coupled to at least one of the nets in series with one another.

10. The integrated circuit of claim 9 wherein the first logic net has a tendency to repetitively switch at irregular intervals between the logic high and low states during normal operation of the integrated circuit.

11. The integrated circuit of claim 9 wherein the first logic net has a tendency to repetitively switch at regular intervals between the logic high and low states during normal operation of the integrated circuit.

12. The integrated circuit of claim 10 and further comprising:
a clock driver having a clock output coupled to the first logic net, wherein the plurality of capacitors are selectively coupled in series with one another to the first logic net.

13. The integrated circuit of claim 9 wherein the plurality of capacitors are selectively coupled in series with one another to a different one of the nets of the integrated circuit than the first logic net.

14. The integrated circuit of claim 13 wherein:
the plurality of nets further comprises a power supply net and a ground supply net; and
the plurality of capacitors are selectively coupled in series with one another, between the power supply net and the ground supply net.

15. The integrated circuit of claim 9 and further comprising:
a plurality of switched capacitor networks, wherein each switched capacitor network comprises a plurality of capacitors selectively decoupled from the plurality of nets, selectively coupled to the first logic net in parallel with one another, and selectively coupled to at least one of the nets in series with one another.

16. The integrated circuit of claim 9 wherein the switched capacitor network comprises:
a first set of transistors having an active state, which couples the plurality of capacitors in parallel with one another, between the first logic net and a ground supply net and an inactive state, which decouples the plurality of capacitors from the first logic net; and
a second set of transistors having an active state, which couples the plurality of capacitors in series with one another, between the ground supply net and at least one of the nets in the integrated circuit and an inactive state, which decouples the plurality of capacitors from the at least one net.

17. The integrated circuit of claim 16 and further comprising:
control means for temporarily pulsing the first set of transistors from the inactive state to the active state and then back to the inactive state just prior to the first logic net switching from the logic high state to the logic low state, for temporarily pulsing the second set of transistors from the inactive state to the active state and then back to the inactive state just prior to the first logic net switching from the logic low state to the logic high state, and for holding the first and second set of transistors in the inactive state at all other times.

18. A method of recycling power in an integrated circuit having a plurality of nets, the method comprising:
(a) repetitively switching a first of the nets on the integrated circuit between logic high and low states during normal operation of the integrated circuit;
(b) temporarily coupling a plurality of capacitors to the first net in parallel with one another when the first net is in the logic high state and then decoupling the plurality of capacitors from the first net while the first net is still in the logic high state; and (c) temporarily coupling the plurality of capacitors in series with one another to at least one of the nets, after step (b).

19. The method of claim 18 wherein the first net comprises a clock net and wherein:

step (b) comprises temporarily coupling the plurality of capacitors to the clock in parallel with one another just prior to the clock net switching from the logic high state to the logic low state and then decoupling the plurality of capacitors from the clock net while the clock net is still in the logic high state; and step (c) comprises temporarily coupling the plurality of capacitors to in series with one another to the clock net just prior to the clock net switching from the logic low state to the logic high state and then decoupling the plurality of capacitors from the clock net while the clock net is still in the logic low state.

20. The method of claim 18 wherein step (c) comprises temporarily coupling the plurality of capacitors in series with one another to a power supply net, after step (b).

* * * * *